United States Patent [19]

Gerdlund

[11] 4,363,158
[45] Dec. 14, 1982

[54] DEVICE FOR INSTALLING HANDLE STICKS IN THE ENDS OF WIENERS

[76] Inventor: Carl P. Gerdlund, Rt. 3, Box 3956, Warren, Oreg. 97053

[21] Appl. No.: 213,234

[22] Filed: Dec. 5, 1980

[51] Int. Cl.³ ............................................. A22C 11/00
[52] U.S. Cl. ...................................... 17/1 S; 426/91; 426/134
[58] Field of Search .................................. 17/1 R, 1 S; 425/DIG. 219; 426/91, 134

[56] References Cited

U.S. PATENT DOCUMENTS

| | | | |
|---|---|---|---|
| 1,835,719 | 12/1931 | Parr | 426/134 |
| 2,210,765 | 8/1940 | Mahlke | |
| 2,303,566 | 12/1942 | Majestic | 17/1 R |
| 2,980,039 | 4/1961 | Jolly | |
| 3,405,422 | 10/1968 | Sico et al. | 17/1 S |
| 3,804,955 | 4/1974 | Chow | |

FOREIGN PATENT DOCUMENTS

| | | | |
|---|---|---|---|
| 45-5429 | 2/1970 | Japan | 99/109 |
| 786217 | 11/1957 | United Kingdom | 426/91 |

*Primary Examiner*—Willie G. Abercrombie
*Attorney, Agent, or Firm*—Eugene M. Eckelman

[57] ABSTRACT

A body member has a bore leading in from one of its ends and a counterbore leading in from its other end joining with the bore. The counterbore is of a size for receiving a wiener endwise therein, and the bore is arranged to slidably receive a handle stick for movement into piercing relation into an end of the wiener. The bore has a specific length to provide efficient and uniform penetration of the stick into the wiener, and the counterbore has a centering end for properly placing the wiener for penetration. The body member is associated with a standard having a lightweight and sturdy clamp portion for removable connection to a counter top.

6 Claims, 4 Drawing Figures

U.S. Patent     Dec. 14, 1982     4,363,158
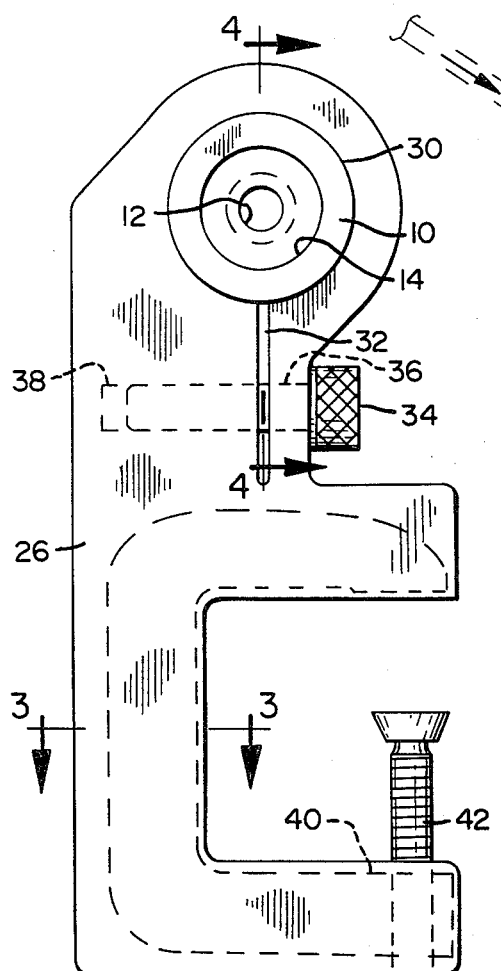
FIG. 2
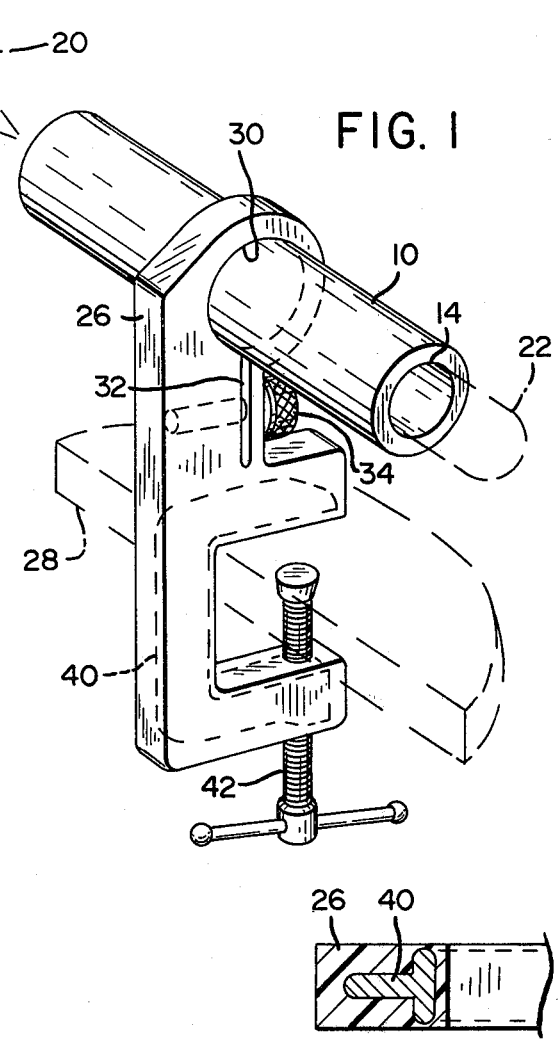
FIG. 1
FIG. 3
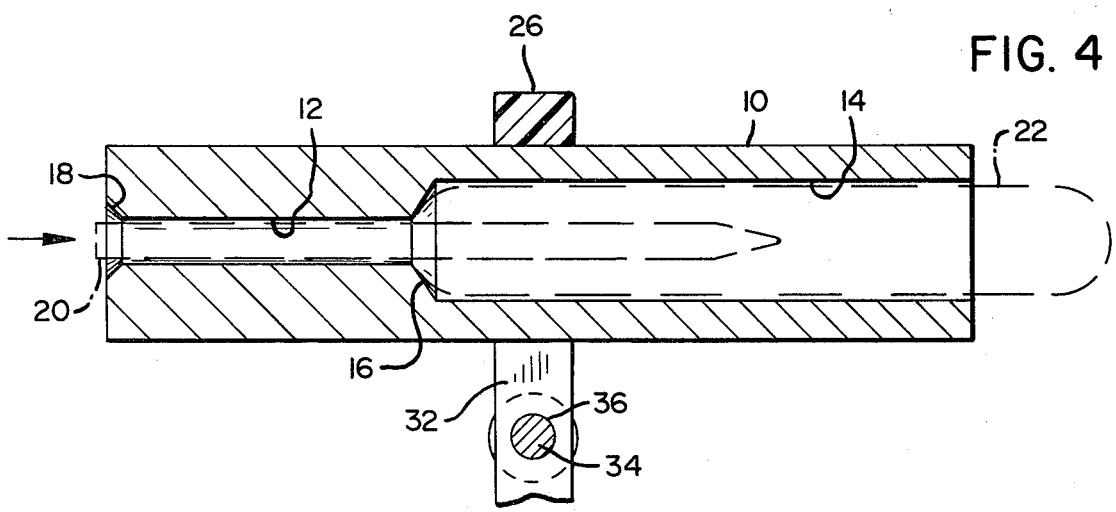
FIG. 4

DEVICE FOR INSTALLING HANDLE STICKS IN THE ENDS OF WIENERS

BACKGROUND OF THE INVENTION

This invention relates to a new and novel device for installing handle sticks in wieners.

It is common practice to install sticks in the ends of wieners by inserting a portion of the stick longitudinally into the wiener. The wiener is then coated, cooked, or otherwise treated and the stick serves as a handle portion while eating the wiener. In commercial establishments such as hot dog stands, restaurants, etc., great volumes of this type of wiener are sold and the hired help thus must insert the sticks at a fast rate. If the sticks are carelessly inserted into the wieners, the latter are ruined or a good connection of the handle is not accomplished. It is thus known that in commercial establishments of the type described many wieners are ruined since the hired help does not have time to carefully install each stick.

SUMMARY OF THE INVENTION

According to the present invention and forming a primary objective thereof, a device is provided which is arranged to receive a wiener and which has guide means for installing a handle stick in one end of the wiener in an arrangement such that the handle is precisely installed whereby to insure a good attachment of the stick to the wiener and at the same time making it a remote possibility of ruining the wiener.

In carrying out the objectives of the invention, a body member is provided having a bore leading in from one end. A counterbore leads in from the other end and joins with such bore. The counterbore is of a diameter to slidably receive a wiener endwise therein and to hold the wiener against any substantial lateral movement. The bore is of a diameter to slidably receive a handle stick and to guide it axially into the wiener. The counterbore is of a length to receive a greater portion of the length of a wiener and the bore has a selected length relative to the length of the handle stick to provide a guide for the piercing distance of the stick in the wiener. The counterbore is tapered at its juncture with the bore to center a wiener at such juncture. The body member is associated with a standard and a metal C-clamp having its body portion molded in embedded relation into the plastic of the standard but having its adjustable screw portion exposed. The body member is removable from the standard for easy cleaning.

The invention will be better understood and additional objects and advantages will become apparent from the following description taken in connection with the accompanying drawings.

BRIEF DESCRIPTION OF THE DRAWINGS

FIG. 1 is a perspective view of the present device with some of the parts thereof as well as other elements shown in broken lines;

FIG. 2 is an enlarged elevational view of the device;

FIG. 3 is a fragmentary sectional view taken on the line 3—3 of FIG. 2; and

FIG. 4 is a fragmentary sectional view taken on the line 4—4 of FIG. 2.

DETAILED DESCRIPTION OF A PREFERRED EMBODIMENT

With particular reference to the drawings, the device of the invention comprises a body member 10 having a bore 12 leading in from one end. This bore extends only partially through the body member and communicates with a counterbore 14 extending in from the other end of the body member. Counterbore 14 at its juncture with the bore 12 has a taper 16 leading toward the bore 12. The outer end of bore 12 opens through a tapered groove 18.

The diameter of the bore 12 is preselected so as to receive a handle stick 20 of the type usually applied to wieners. The diameter of counterbore 14 is preselected so as to receive wieners longitudinally therein. Each of bores 12 and 14 is arranged to receive its respective element in a freely slidable but yet sufficiently axial arrangement whereby there will be a fairly precise axial positioning of the stick 20 into the wiener 22. The taper 16, however, will center the inner end of the wiener relative to the inner end of the bore 12, and although it is necessary to provide various diameter body members to accommodate different size wieners, the centering feature provided by the taper 16 does not make the use of a precisely sized counterbore 14 critical.

In a preferred arrangement, the length of the bore 12 is about one-third the length of the counterbore 14 whereby a sufficient guiding passageway is provided for the stick and at the same time a good support is provided for the wiener. Also in a preferred arrangement, the bore 12 has a selected length relative to the length of the stick so that the operator after inserting the wiener in the counterbore 14 merely has to insert the stick fully into the bore 12. Such full insertion provides a uniform distance of penetration of the stick and also provides a fast operation. Tapered groove 18 around the outer end of the bore 12 provides easy initial insertion of the end of the stick into the bore 12.

Body member 10 is associated with a standard 26 arranged to clamp it on a counter top 28 or the like. Such standard comprises an upper portion with an aperture 30 arranged removably to receive the body member 10. Standard 26 has a slot 32 extending downwardly from the aperture 30 adjacent one of the edges thereof whereby to provide some flexibility to the standard at the aperture 30. A clamp screw 34 extends edgewise into the body member at right angles across the slot 32, such screw passing freely through an aperture 36 leading in from the one edge and having threaded engagement in a tapped bore 38 on the other side of the slot 32. By backing off the screw 34, the body member can be inserted by distorting the standard around the aperture 30 and sliding it in place and upon tightening such screw, the standard tightly clamps the body member in place.

Standard 26 is preferably molded from plastic for easy maintenance. To provide a lightweight yet rugged structure, a metal C-clamp 40 is molded within the plastic with the turn screw 42 thereof exposed.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A device for installing handle sticks in the ends of wieners comprising
   (a) a body member having opposite ends,
   (b) a first bore leading in from one end of said body member and extending through a partial length of the latter,
   (c) and a uniform diameter second bore leading in from the other end of said body member,
   (d) said second bore joining with said first bore and being of enlarged diameter relative to said first bore forming an internal shoulder in said body member,
   (e) said second bore being of a size arranged to freely receive a wiener endwise therein and arranged to stabilize the wiener against lateral movement with one end of the wiener abutted against said shoulder,
   (f) said first bore being of a size which is arranged to slidably receive a handle stick and guide the stick substantially axially relative to a wiener in said second bore for installing a stick in piercing relation in end projecting relation in a wiener.

2. The device of claim 1 wherein said first bore has a selected length relative to the length of a handle stick so as to provide a guide for the piercing distance of the sticks into the wieners.

3. The device of claim 2 wherein said second bore is substantially longer than the first bore.

4. The device of claim 1 wherein said shoulder is tapered toward its juncture with said first bore to provide a centering function for a wiener inserted in said second bore up to said shoulder.

5. The device of claim 1 including a C-clamp type holder on said body member for attachment to a counter top, said holder including a plastic standard and a metal C-clamp having its body portion molded in said plastic and its adjustable turn screw portion exposed.

6. The device of claim 5 including a removable connection between said body member and said standard.

* * * * *